Figures 1, 2, 3:
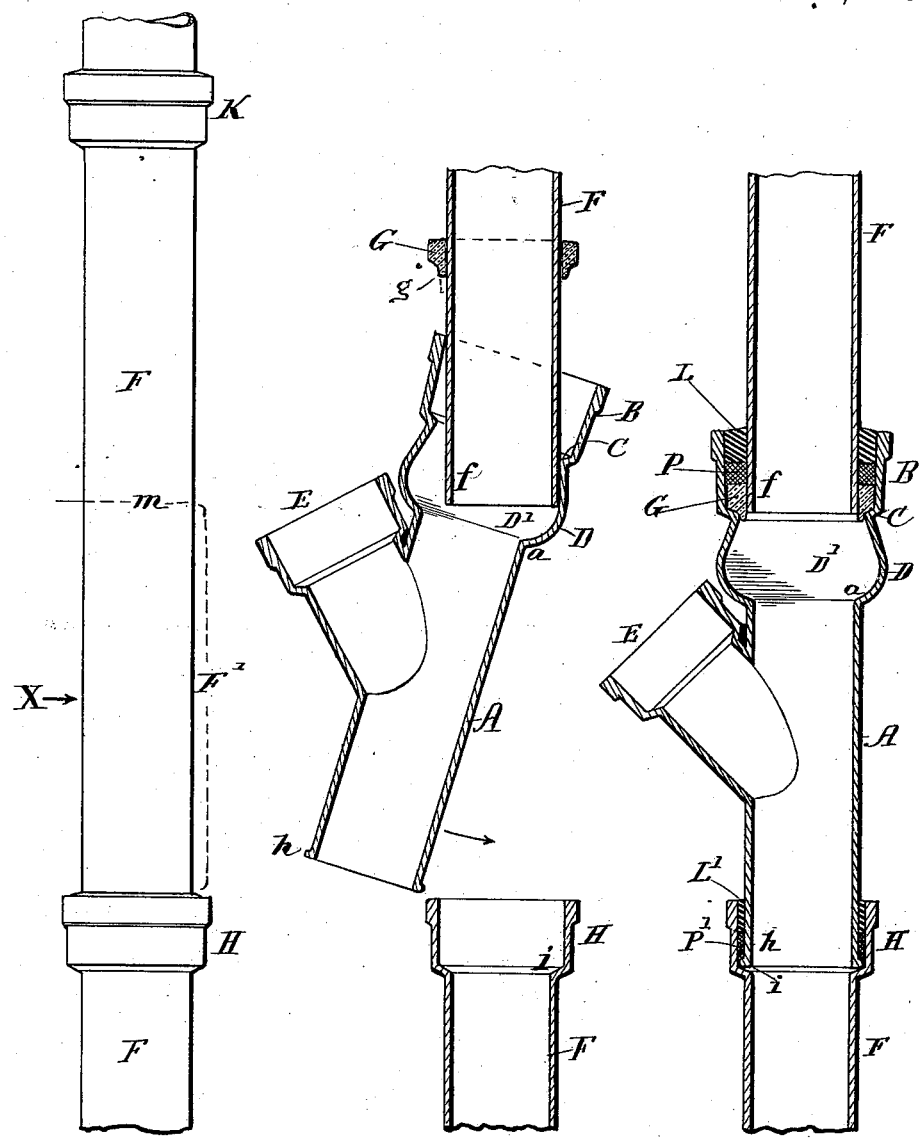

(No Model.)

J. D. SISSON.
INSERTIBLE JOINT FOR IRON PIPES.

No. 591,362. Patented Oct. 5, 1897.

Witnesses.
Charles S. Bacon
W. E. Buck

Inventor.
Jacob D. Sisson
By Chas. H. Burleigh
Attorney

UNITED STATES PATENT OFFICE.

JACOB D. SISSON, OF WORCESTER, MASSACHUSETTS, ASSIGNOR OF ONE-HALF TO ISRAEL L. CURRIER, OF SAME PLACE.

INSERTIBLE JOINT FOR IRON PIPES.

SPECIFICATION forming part of Letters Patent No. 591,362, dated October 5, 1897.

Application filed November 16, 1896. Serial No. 612,327. (No model.)

*To all whom it may concern:*

Be it known that I, JACOB D. SISSON, a citizen of the United States, residing at Worcester, in the county of Worcester and State of Massachusetts, have invented a new and useful Insertible Connection and Joint for Cast-Iron Hub-Pipes, of which the following, together with the accompanying drawings, is a specification sufficiently full, clear, and exact to enable persons skilled in the art to which this invention appertains to make and use the same.

When cast-iron soil-pipe is erected in buildings, the joints of the several cast lengths are made permanent by packing and leading, which is tamped or calked solidly into the annular space within the socket-hubs. In plumbing practice it frequently occurs that a branch or connection is desired in a finished line of soil-pipe where no provision for such connection was originally contemplated, and it has always been a matter of much labor and expense with the previously-existing style of fittings to make the required attachment or change in the line of soil-pipe, as it generally necessitates the tearing down of superimposed main pipe, the breaking out of joints above the desired place of attachment, and, occasionally, the raising up bodily or the entire removal of a long line of soil-pipe in order to enable the workmen to put the required fitting or connecting section having the Y branch, T, or other form properly into the existing main line of soil-pipe, thereby engendering much labor and expense.

The object of my present invention is to obviate the necessity for this great labor and expense in making the attachments such as above noted and to provide a cast-metal hub-pipe connection and joint adapted, as described, for insertion at any desired position in a line of soil-pipe after such pipe is erected in a building or structure by first cutting out an equal portion of the standing soil-pipe and introducing the connection; also, to afford means for sustaining and properly closing the joint at the introduced connection. These objects I attain by the means illustrated in the drawings, wherein—

Figure 4:
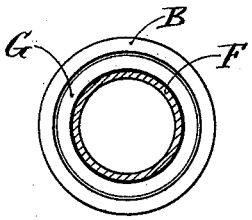

Figure 1 represents a portion of a line of cast-iron soil-pipe of usual construction to illustrate the purpose to which my invention is applicable. Fig. 2 is a sectional view of my invention, showing the manner of its insertion between the several parts of the standing soil-pipe. Fig. 3 is a similar section showing the connection in position and joint-packings completed, and Fig. 4 is a top end view of the enlarged socket-hub and packing-seat ring and a transverse section of the soil-pipe therein.

In accordance with my invention I construct the connection, fitting, or pipe-section A with a socket or hub B of greater internal diameter in proportion to the dimension of the soil-pipe than is the usually-employed hub, and said enlarged hub is furnished with an inward shoulder C, the inner circle of which exceeds the normal exterior dimension of the soil-pipe, while immediately below said shoulder I provide a secondary hub D or annular bulbous enlargement of the casting, affording an interior chamber D', the length of which equals or exceeds the socket length of the ordinary soil-pipe hub H. The lower portion of the connection or pipe-section, with its branch hub E, may be of the regular well-known forms, its diameter corresponding with the line soil-pipe F. The enlarged portion D is gathered in at its lower portion and joins the cylindrical body A by a downwardly-inclined shoulder or curve at *a*, as indicated.

The lower or spigot end *h* of the connection is of the usual form.

For concentrically sustaining and properly closing the connection-joint and supporting the joint-packing of the enlarged hub I provide a ring G, the inner diameter of which will readily slip over the exterior of the main pipe F, while the outer periphery of said ring approximately corresponds with the interior of the socket-hub B and its shoulder C. Said ring is preferably made of soft metal, as lead, or equivalent malleable material, and with a downward lip *g* of any desired length.

In the practical application of my invention when it is desired to introduce a connection at any part of a standing line of soil-pipe—as, for instance, at point X, Fig. 1—without tearing out the approaching soil-pipe or breaking the joint K above the point of connection, since with my improved connection, simply cut off the standing soil-pipe at a position m corresponding to the make-up length of the connection A, then break out the portion F' of said pipe and clear out the joint-socket of the first hub H below the space. The ring G is then slipped onto the soil-pipe above the cut-out space, and the connection A is then inserted, as indicated in Fig. 2, by entering the dependent end f of the soil-pipe F into the enlarged chamber D', which permits said end to pass below the shoulder C and allows the spigot end h of the connection A to be carried over the top edge of the hub H and then lowered within said hub against the shoulder i, thereby leaving the cut-off end f of the soil-pipe adjacent to the shoulder C. The ring G is then slipped down within the hub-socket to rest upon the shoulder, where it may be tamped, so as to form a compact annular wedge and packing-seat between the adjacent socket and pipe-surfaces. The joint is then made permanent with oakum packing P and a filling of lead L, calked solidly into the annular space in the usual well-known manner. The joint at the lower end is also packed, leaded, and calked in the usual manner, thus completing the attachment, as shown in Fig. 3.

In the present instance my invention is shown as applied in a Y branch, but it will be understood as equally applicable to T-fittings, double Y's, and cross or any of the several forms of connection that are employed in cast-metal hub-pipe structure, and I include such forms, when embodying the features above specified, as within the scope of my invention, the same being applicable in like manner to all cast-iron hub-jointed pipes, including common soil-pipe, and also such as used for water-supply mains in streets and other situations.

What I claim as of my invention herein, to be secured by Letters Patent, is—

1. A cast-iron hub-pipe section having the hub B and shoulder C, and formed with an annular swell or circumferential bulge D adjacent to said hub immediately below said shoulder, as shown and hereinbefore described.

2. In combination with the main-line pipe F, the branch connection having the enlarged circular hub and shoulder, and provided with the annular enlargement D adjacently below said shoulder, and the metal ring G arranged to slip onto the main-pipe end and adapted to fit within the space between the pipe and hub surfaces and upon said shoulder, concentrically sustaining said parts and forming a seat for the joint-packing, as set forth.

3. The combination with a cast-metal hub-pipe fitting, Y branch, or T connection, having a socket-hub, a shoulder, and an internal chamber of greater lateral dimension than the main-pipe diameter, of an annular packing seat or ring having an internal dimension corresponding with the main-pipe diameter, and externally fitted to match and rest upon said shoulder within the socket-hub, and adapted to serve for wedging the joint above said chamber, as set forth.

Witness my hand this 13th day of November, A. D. 1896.

JACOB D. SISSON.

Witnesses:
CHAS. H. BURLEIGH,
I. L. CURRIER.